2,927,609

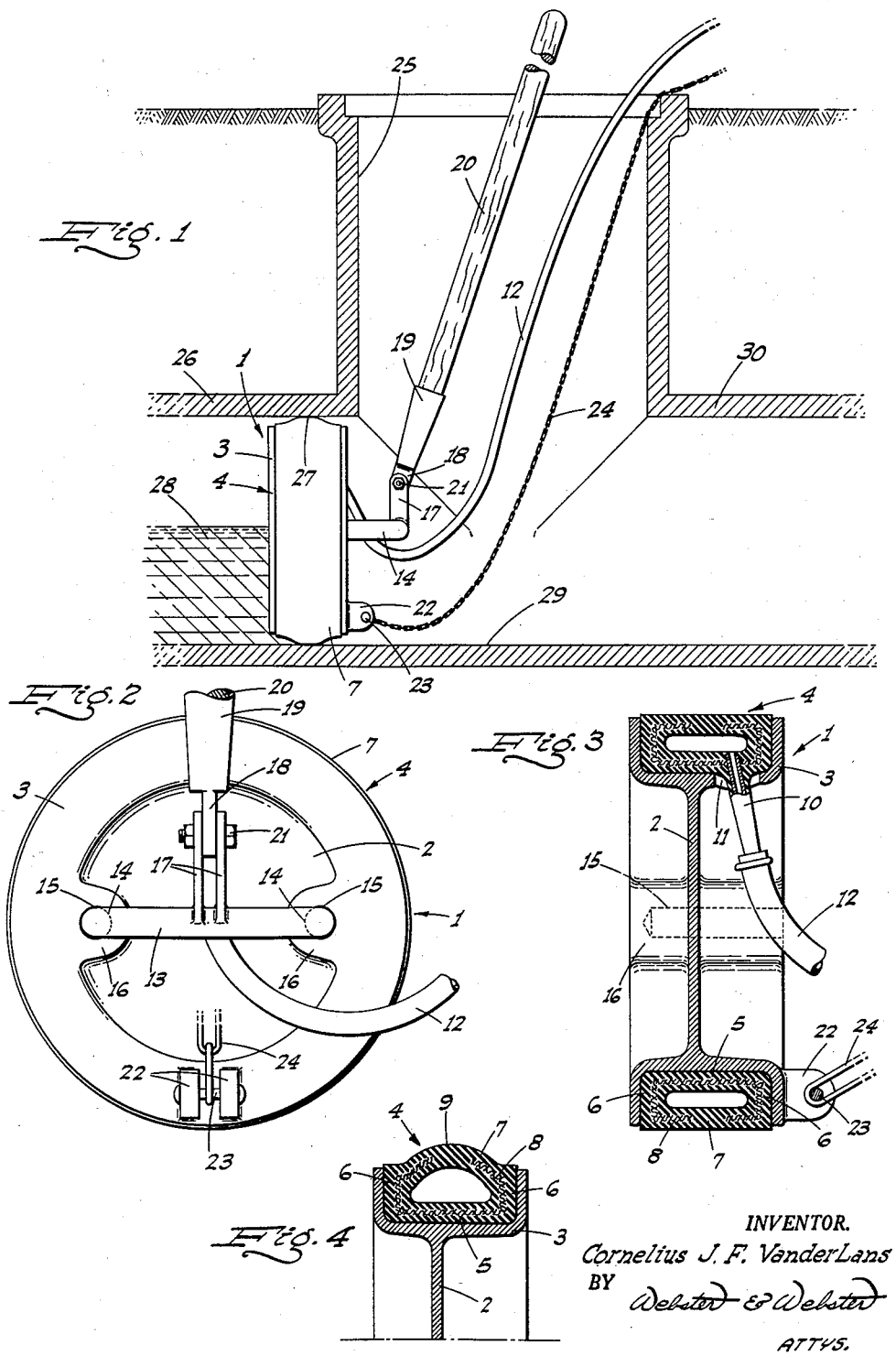

TEMPORARY PLUG FOR PIPES

Cornelius J. F. VanderLans, Lodi, Calif., assignor to Vanderlans & Sons, Lodi, Calif.

Application April 8, 1957, Serial No. 651,496

3 Claims. (Cl. 138—93)

This invention is directed to, and it is a major object to provide, a temporary plug for use in sewer pipes or the like.

Another important object of the invention is to provide a temporary plug which is adapted to be engaged, in sealing relation, in the up-stream section of a sewer pipe to stop the water flow into—and to permit of access for inspection, repair, or cleaning of—a manhole portion of the sewer pipe and the down-stream section of the latter.

An additional object of the invention is to provide a temporary plug, for a sewer pipe, which is of disc form, channeled at the periphery, and having a novel expansible annular sealing tube in the channel adapted, when expanded, to effectively seal the plug in the pipe and in a manner to withstand substantial water pressure without leakage.

A further object of the invention is to provide a temporary plug, for a sewer pipe, which is manually portable, and arranged so that it can be readily and conveniently installed in—or removed from—the up-stream section of a sewer pipe by an operator who remains above ground, and by manipulating the device through the manhole.

It is also an object of the invention to provide a temporary plug, for a sewer pipe, which is designed for ease and economy of manufacture.

Still another object of the invention is to provide a practical, reliable, and durable temporary plug for a sewer pipe.

These objects are accomplished by means of such structure and relative arrangement of parts as will fully appear by a perusal of the following specification and claims.

In the drawings:

Fig. 1 is a side elevation of the device as in use; the sewer pipe and the manhole being in section.

Fig. 2 is a front elevation of the plug unit.

Fig. 3 is a vertical diametral section of the plug unit showing the sealing tube in its initial or uninflated condition.

Fig. 4 is a fragmentary view similar to Fig. 3, but shows the sealing tube as inflated.

Referring now more particularly to the drawings, and to the characters of reference marked thereon, the device includes a plug unit, indicated generally at 1, and which comprises a disc 2 formed at the periphery with an annular, radially outwardly opening channel 3; the disc 2 being disposed intermediate the sides of said channel, and the latter being of substantial breadth and depth. The channel 3 is—as shown—of considerably greater breadth than depth, and is substantially rectangular in cross section.

A hollow inflatable ring or sealing tube, indicated generally at 4, is seated in matching relation in the channel 3; such sealing tube being of flexible and resilient material, preferably heavy-duty rubber.

The outer face or periphery of the sealing tube 4 is initially transversely flat, and is disposed only a slight distance radially out from the periphery of the channel 3; the initial outside diameter of the plug unit 1 being somewhat lesser than the inside diameter of the pipe section in which said unit is adapted to be used.

The sealing tube 4 includes an inner wall 5, end walls 6, and an outer wall 7; there being a circumferentially continuous reinforcement 8 of fabric or the like which extends unbroken in the inner wall 5, thence outwardly in the end walls 6, and finally inwardly in the outer wall 7; terminating, however, short of a central portion of the latter.

In other words, the sealing tube 4 includes reinforcement throughout, saving and excepting a central circumferential portion of the outer wall 7. By omitting the reinforcement 8 from said central circumferential portion of the outer wall 7, such portion bulges outwardly more readily when the sealing tube 4 is inflated, with the result that the outer wall 7 assumes the symmetrically rounded and outwardly protruding shape or bulge shown at 9 in Fig. 4. At the same time the remainder of the sealing tube 4 continues to seat, in substantially matching relation, in the channel 3, as is desirable.

The sealing tube 4 includes a stem 10 which extends generally radially inwardly through an opening 11 in the bottom of the channel 3; said stem 10 being connected to a hose 12 adapted at the other end for connection to a valve controlled source of air pressure, such as a pump unit (not shown).

A cross bar 13 is disposed horizontally and in spaced relation ahead of the disc 2, and such cross bar 13 includes—at its ends—integral, inwardly projecting stand-off legs 14 which are removably engaged in sockets 15 in enlargements 16 on the disc 2.

Centrally of its ends the cross bar 13 is formed with a rigid upstanding clevis 17 which receives the tongue 18 on the lower end of a handle socket 19; the latter carrying a relatively long handle 20. The tongue 18 is secured against movement in the clevis 17 by a bolt 21.

At the bottom, and on the front thereof, the plug unit 1 includes transversely spaced, forwardly projecting ears 22 having a cross pin 23 spanning therebetween; such cross pin passing—between said ears—through the end link of a safety and pull-out chain 24.

In use of the above described temporary plug, the sealing tube 4 is initially deflated, and the plug unit 1 is then lowered from above ground into the manhole 25, and manipulated by the handle 20 to cause insertion of said plug unit 1 in the up-stream section 26 of the sewer pipe. The hose 12 and the safety and pull-out chain 24 then extend from the plug unit 1 upwardly through and out of said manhole 25; the chain being suitably anchored above ground, and the hose 12 being connected to a valve regulated source of air pressure, as previously described.

With the plug unit 1 held in the desired position of the up-stream section 26 of the sewer pipe, the sealing tube 4 is inflated, which produces the described circumferential bulge 9, and which bulge engages—in effective sealing relation—with the inner wall of the up-stream section 26 of the sewer pipe; the circumferential line of sealing being indicated at 27.

With the plug unit 1 thus in place, the flow of water 28 from the up-stream section 26 of the sewer pipe is effectively blocked, permitting of access through the manhole 25 to the manhole portion 29 of the sewer pipe, as well as the down-stream section 30 thereof, for the purpose of inspection, cleaning, or repair.

If desired, the handle 20 can—after the plug unit 1 is in place—be detached therefrom and withdrawn from the manhole by the simple expedient of first manipulating such handle in a manner to withdraw the legs 14 from the sockets 15.

To remove the plug unit 1, the sealing tube 4 is deflated, and said plug unit is then lifted out of the manhole 25 by the chain 24.

From the foregoing description it will be readily seen that there has been produced such a device as will fully appear by a perusal of the following specification and claims.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A temporary plug, for insertion in a sewer pipe, comprising a disc having an annular outwardly opening channel thereon, an inflatable sealing tube seated in the channel, means to introduce air into the tube to inflate the same, the tube when inflated expanding radially outwardly beyond the channel whereby to engage in circumferential sealing relation in the sewer pipe in which the plug is inserted, and means embedded in the tube material arranged to allow the maximum expansion thereof to take place in a circumferential outer portion of the tube intermediate the sides thereof; said last named means comprising non-extensible reinforcing cords embedded in the tube and extending transversely thereof about the radially inner and side portions thereof but the ends of each cord being spaced apart from each other in the transverse central area of said circumferential outer portion of the tube.

2. A temporary plug, for insertion in a sewer pipe, comprising a disc having an annular outwardly opening channel thereon, an inflatable sealing tube seated in the channel, means to introduce air into the tube to inflate the same, the tube when inflated expanding radially outwardly beyond the channel whereby to engage in circumferential sealing relation in the sewer pipe in which the plug is inserted, a rigid handle, and means rigidly but removably connecting the handle to the disc at opposed points substantially diametrically of the disc.

3. A temporary plug, for insertion in a sewer pipe, comprising a disc having an annular outwardly opening channel thereon, an inflatable sealing tube seated in the channel, means to introduce air into the tube to inflate the same, the tube when inflated expanding radially outwardly beyond the channel whereby to engage in circumferential sealing relation in the sewer pipe in which the plug is inserted, a rigid handle, a cross bar to which the lower end of the handle is rigidly secured, and legs projecting from the ends of the bar at right angles thereto; the disc having opposed sockets, substantially parallel to and on opposite sides of the axis of the disc, in which the legs removably fit.

References Cited in the file of this patent

UNITED STATES PATENTS

| | | |
|---|---|---|
| 539,568 | Bride | May 21, 1895 |
| 680,974 | Healey | Aug. 20, 1901 |
| 2,299,116 | Svirsky | Oct. 20, 1942 |
| 2,327,615 | Ankarlo | Aug. 24, 1943 |
| 2,559,564 | Sperling | July 3, 1951 |
| 2,678,666 | Theis et al. | May 18, 1954 |

FOREIGN PATENTS

| | | |
|---|---|---|
| 841,668 | Germany | June 19, 1952 |